United States Patent [19]

Howes

[11] Patent Number: 5,558,827
[45] Date of Patent: Sep. 24, 1996

[54] DECORATIVE WINDOW HAVING SIMULATED CAME STRUCTURE

[76] Inventor: Stephen E. Howes, 741 SE. Sixth Ter., Pompano Beach, Fla. 33060

[21] Appl. No.: 405,148

[22] Filed: Mar. 16, 1995

Related U.S. Application Data

[63] Continuation-in-part of Ser. No. 807,236, Dec. 16, 1991, abandoned.

[51] Int. Cl.⁶ ............................. B32B 17/10; B44F 1/06
[52] U.S. Cl. ............................. 264/220; 156/63; 428/38
[58] Field of Search ..................... 428/13, 38; 156/63; 264/220

[56] References Cited

U.S. PATENT DOCUMENTS

| | | | |
|---|---|---|---|
| 1,524,998 | 2/1925 | Russell | 428/38 X |
| 1,634,251 | 7/1927 | Aronson | 428/31 X |
| 1,709,267 | 4/1929 | Horton | 52/204.61 |
| 2,020,178 | 11/1935 | Haas | 264/261 |
| 2,069,227 | 2/1937 | Eichstädt | 264/338 |
| 2,991,213 | 7/1961 | Williams | 428/38 X |
| 3,097,080 | 7/1963 | Weir | 428/15 X |
| 3,183,140 | 5/1965 | Gibson, Jr. | 428/38 |
| 3,381,066 | 4/1968 | Lowe et al. | 264/71 |
| 3,382,137 | 5/1968 | Schreiber et al. | 428/339 |
| 3,420,730 | 1/1969 | Ellefson | 428/38 |
| 3,460,303 | 8/1969 | Algrain et al. | 428/38 X |
| 3,512,320 | 5/1970 | Ferron et al. | 428/38 X |
| 3,516,893 | 6/1970 | Gerard | 428/38 X |
| 3,522,686 | 8/1970 | Gordon et al. | 156/245 X |
| 3,533,889 | 10/1970 | Powell | 428/38 X |
| 3,546,051 | 12/1970 | Utz | 428/38 |
| 3,580,192 | 5/1971 | Davidson | 52/36.3 X |
| 3,713,958 | 1/1973 | McCracken | 428/38 |
| 3,725,112 | 4/1973 | Hansen | 428/13 |
| 3,848,046 | 11/1974 | Machet | 428/38 X |
| 3,931,425 | 1/1976 | Kuroda | 428/38 |
| 3,998,680 | 12/1976 | Flint | 428/34 X |
| 4,068,441 | 1/1978 | Shaffer | 428/38 X |
| 4,083,916 | 4/1978 | Chasse | 428/15 X |
| 4,154,880 | 5/1979 | Drennan | 428/38 |
| 4,217,326 | 8/1980 | Goralnik | 428/38 X |
| 4,283,894 | 8/1981 | Raty | 52/311.1 |
| 4,299,639 | 11/1981 | Bayer | 428/38 X |
| 4,318,946 | 3/1982 | Pavone | 428/38 X |
| 4,318,952 | 3/1982 | Barker et al. | 428/172 |
| 4,335,170 | 6/1982 | Butler | 428/38 |
| 4,343,758 | 8/1982 | Goralnik | 428/38 X |
| 4,409,275 | 10/1983 | Samowich | 428/138 |
| 4,427,733 | 1/1984 | Pöll et al. | 428/200 |
| 4,438,165 | 3/1984 | Butler | 428/38 |
| 4,488,919 | 12/1984 | Butler | 428/38 X |
| 4,495,739 | 1/1985 | Drennan | 428/38 X |
| 4,499,126 | 2/1985 | Suzuki et al. | 428/13 |
| 4,518,446 | 5/1985 | Drennan | 428/38 X |
| 4,619,850 | 10/1986 | Charlton | 428/38 |
| 4,687,609 | 8/1987 | Strugatz | 264/132 |
| 4,718,963 | 1/1988 | Pöll et al. | 428/79 X |
| 4,756,938 | 7/1988 | Hickman | 428/38 |
| 4,767,647 | 8/1988 | Bree | 428/14 |
| 4,791,010 | 12/1988 | Hanley et al. | 428/38 X |

(List continued on next page.)

FOREIGN PATENT DOCUMENTS

| | | |
|---|---|---|
| 541549 | 1/1985 | Australia . |
| 1590116 | 5/1981 | United Kingdom . |

*Primary Examiner*—Henry F. Epstein
*Attorney, Agent, or Firm*—Wood, Herron & Evans, P.L.L.

[57] ABSTRACT

A simulated multipane window consists of a thick transparent plastic resin layer molded onto a sheet of glass. The outer surface of the resin layer includes simulated came structure between adjacent panel portions of the window. The decorative window is produced as a replica of a glass master originally made using actual glass panels, such as beveled glass panels. The master is then covered with a mixture of silicone, catalysts for curing the silicone, and a light oil to form a mold. After curing, the mold is removed from the glass master, inverted and a glass sheet, which has been prepared of the process by being coated with organosilane ester, is clamped thereto. The mold cavity is then filled with a mixture of a clear plastic resin, catalysts for curing the resin, and organosilane ester. After curing, the simulated multipane window is removed from the mold.

15 Claims, 2 Drawing Sheets

U.S. PATENT DOCUMENTS

| | | | |
|---|---|---|---|
| 4,798,695 | 1/1989 | Redel | 428/13 X |
| 4,822,680 | 4/1989 | Catalano et al. | 428/425.6 |
| 4,904,513 | 2/1990 | DeNicolo | 428/38 X |
| 5,039,468 | 8/1991 | Sellers | 428/38 X |
| 5,061,531 | 10/1991 | Catalano | 428/34 |
| 5,089,076 | 2/1992 | Leach et al. | 428/13 X |
| 5,205,884 | 4/1993 | Rauscher | 428/38 X |
| 5,209,956 | 5/1993 | Poll | 428/13 |
| 5,306,535 | 4/1994 | Shaffer | 428/38 |
| 5,330,602 | 7/1994 | Leach | 428/402 X |

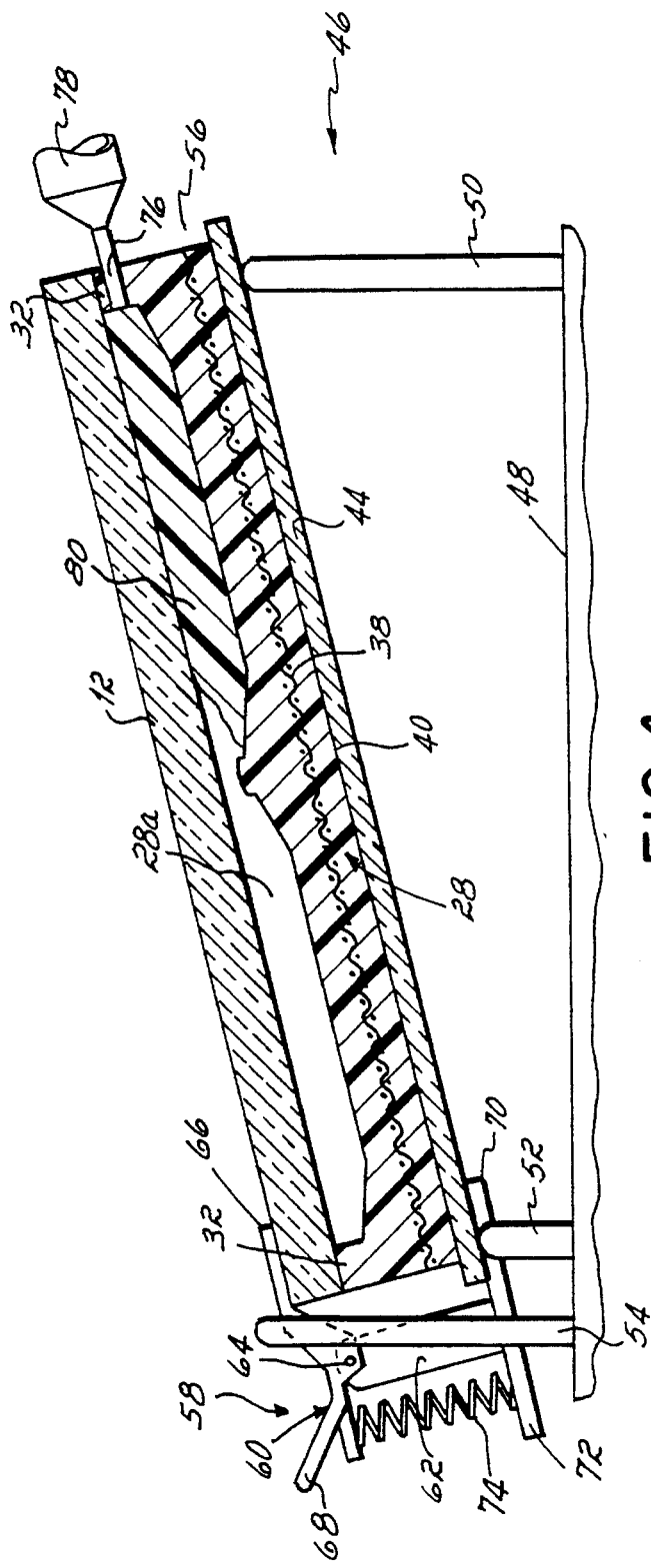
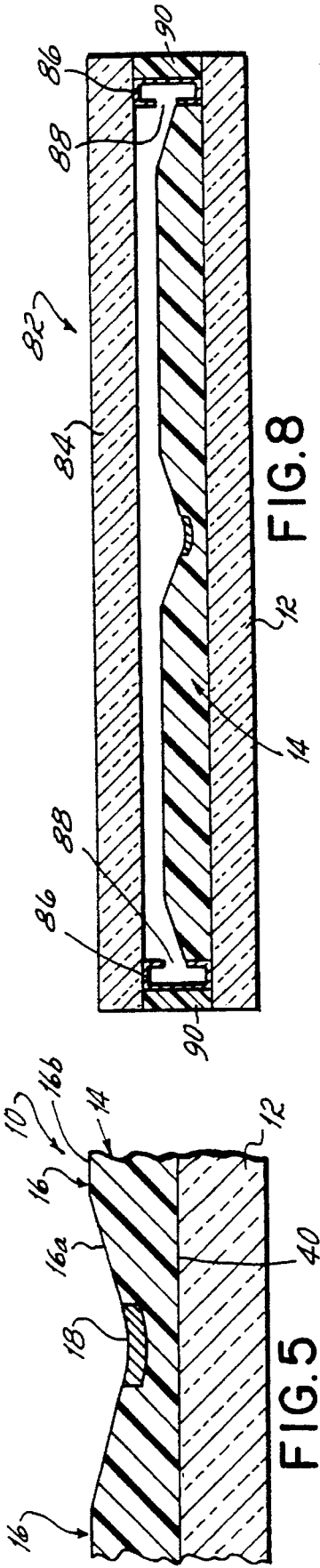

DECORATIVE WINDOW HAVING SIMULATED CAME STRUCTURE

This application is a continuation-in-part of U.S. patent application Ser. No. 07/807,236, filed Dec. 16, 1991and now abandoned. U.S. patent application Ser. No. 07/807,236 is hereby expressly incorporated herein by reference.

BACKGROUND OF THE INVENTION

This invention generally relates to decorative windows and, more specifically, to window panes having the look of traditional leaded glass or other came-formed multipanel window structure.

Windows formed of individual panes fastened together with "came" are well known, especially in the area of stained or leaded glass. Came is the traditional term used for the slender, grooved lead rod or other soft metallic rod conventionally used for fastening such window panes together. These types of windows are becoming increasingly popular especially in the front doors of new homes and as windows disposed adjacent and above such doors. Windows are also being constructed using glass formed in individual panes fastened together with came in other residential and commercial applications for both decorative and privacy purposes.

Among the principal disadvantages of traditional stained or leaded glass windows is their relatively high cost. It will be appreciated that the construction of windows from a plurality of individual panes fastened together by "came" or metallic connecting rod involves intense skilled labor. Moreover, windows of this type generally do not have high mechanical strength or good thermal properties. The effects of the low impact resistance of the glass panes which are generally used is accentuated by the bevels contained in these panes as well as by the relatively weak joints formed at the lead or other soft metallic came. The transfer of heat between the interior and exterior of a building between the glass panes can significantly increase heating and air conditioning requirements of the building. Finally, decorative windows made as composites of several glass panels cannot be used in many architectural applications because building codes require the use of safety glass windows in entry doors and load bearing walls.

Many attempts have been made to simulate traditional decorative windows using various manufacturing processes having lower relative costs. For example, windows with decorative designs and surfaces have been injection molded using clear thermoplastic materials, such as certain types of polycarbonate. However, injection molding has a serious disadvantage related to the high cost of the required tooling. The high cost of the dies required for injection molding is particularly significant since suppliers of windows and associated architectural elements generally need to have an inventory including a large number of window sizes and styles. Also, injection molded thermoplastic windows have not generally met with commercial success as fine architectural elements because they do not look and feel like real glass. Rather, thermoplastic windows are much too flexible compared to glass and transmit and reflect light differently than real glass. In addition, limitations in the ability of the die casting process to produce certain features, such as sharp internal and external edges, detract from the appearance of plastic substitutes for decorative glass panels.

SUMMARY OF THE INVENTION

In accordance with one aspect of this invention, there is provided a decorative window including a flat sheet of glass and a cured translucent layer of plastic resin of substantial thickness having the look of individual panes separated by simulated came. While the translucent layer of plastic resin will desirably allow light to pass through the window, the resin is even more preferably a clear transparent resin through which objects on the other side of the window may be easily seen. The resin is directly molded onto the flat sheet of glass and extends as a single continuous layer to a border area around a periphery of the sheet of glass. The layer of plastic resin has a continuous flat inner surface which contacts a first surface of the sheet of glass and an outer surface which includes contours in the shapes of individual panes of glass separated by the simulated came.

In accordance with another aspect of this invention, there is provided a process of preparing a replicated multipane window or transparent sheet member having a cured resin layer adhered to a glass sheet and having simulated came structure located remote from the sheet of glass. The process includes the steps of coating the glass sheet with an adherent material and clamping a mold to the glass sheet. The mold has a flat peripheral region and a cavity extending inwardly from the peripheral region, the peripheral region being in contact with the glass sheet. The process further includes filling the internal cavity of the mold with a catalyzed transparent plastic resin including the adherent material and allowing the resin to cure within the internal cavity. After the resin cures, the mold is removed and the cured resin is left as a unitary piece with the adhered glass sheet as a backing. The final step in the process of making the replicated multipane window involves the application of a curable viscous fluid which is a resin simulating conventional came or metallic connecting rod pieces of a conventional leaded glass or other came window structure.

In accordance with other aspects of this invention, there is provided a method for making a master and a mold from the master for subsequent use in fabricating replicas of the master. The method of making the master generally involves the placement of multiple master panel pieces on a backing plate or board and leaving a precise, predetermined gap between adjacent individual master panel pieces. These master panel pieces are preferably formed from glass and adhesively secured to a laminated piece of backing glass which has been laid over a corresponding design drawing indicating the respective orientation and placement of the master panel pieces. The individual master panel pieces are preferably adhered to the backing sheet or board using a full perimeter bead or coating of silicone so as to seal each piece to the laminated glass backing sheet. In the preferred embodiment of this invention, a precise gap of one quarter inch is left between adjacent master panel pieces. After all of the master panel pieces are adhered and cured, a high shine epoxy resin is filled between the master panel pieces and within the precise, predetermined gap to a height which is below the upper surfaces of the master panel pieces. When beveled glass is used, as is desirable in the case of replicating stained or leaded glass windows, this epoxy resin filler is applied up to approximately two thirds the height of the unbeveled vertical edge of each adjacent master panel piece.

To make the mold from the master described above, a surrounding framework of upstanding walls spaced apart from the glass master is constructed. Importantly, the upper surface of the space contained between the glass master and the framing must be disposed at a height which is below the height of the filler material contained in the predetermined gaps between the master panel pieces. In addition to this, it has been determined that the upper surface of the peripheral space contained between the master and the framing preferably should not be more than approximately one eighth inch below the upper surfaces of the master panel pieces. Therefore, if one eighth inch thick master panel pieces are used, then no height compensating spacers will be necessary in the space between the master and the framework. However, if master panel pieces thicker than one eighth inch are used, then a peripheral height compensating spacer will be necessary within the space between the master and the framework to bring the upper surface of this peripheral space up to a height which is approximately one eighth inch below the upper surfaces of the master panel pieces. These relationships ensure that the final clear plastic resin portion of the replica window is neither too thick nor too thin and that a replica is produced which is virtually indistinguishable from an all glass, traditionally formed multipane window.

Further objectives and advantages of the present invention will become more readily apparent to those of ordinary skill in the art upon review of the following detailed description of the invention taken in conjunction with the accompanying drawings.

BRIEF DESCRIPTION OF THE DRAWINGS

FIG. 4 is a cross-sectional elevation of the mold shown in preparation in FIG. 3 being filled with clear resin material to form a replica of the glass master shown in FIG. 2;

FIG. 5 is an enlarged view of the encircled portion "5" of FIG. 1 showing in greater detail the finished gap between adjacent panel portions of the replica;

DETAILED DESCRIPTION OF THE PREFERRED EMBODIMENTS

The Decorative Multipane Window

Figure 1:
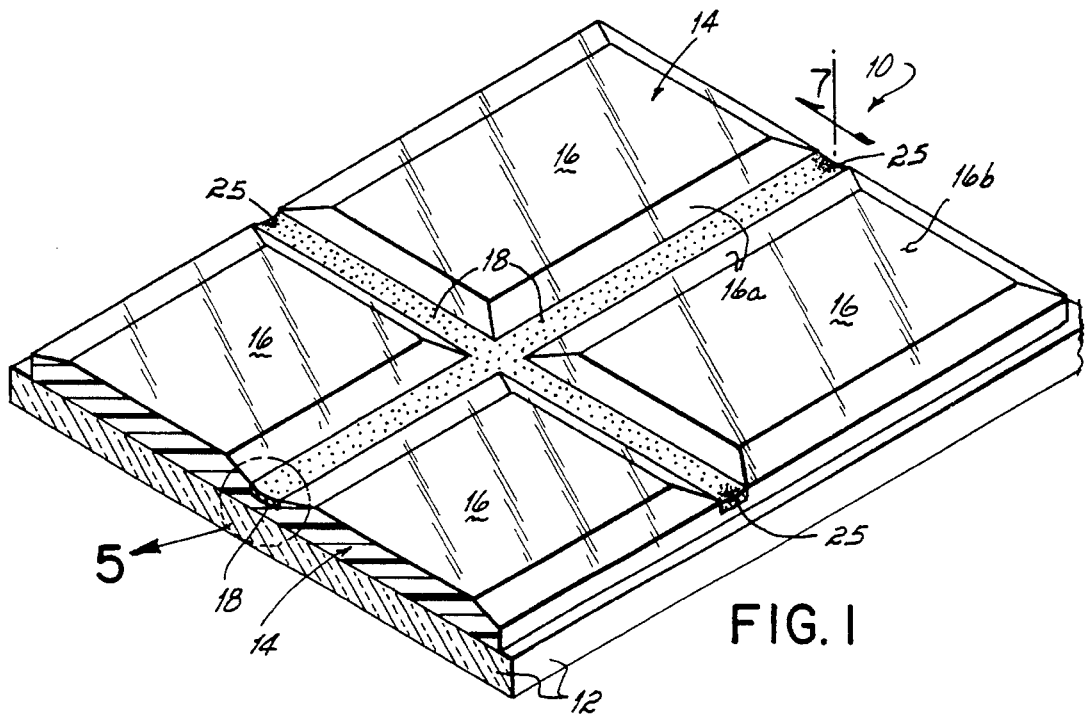
FIG. 1 is a perspective, partly cross-sectional view of a decorative multipane window or replica in which a simulated multipanel resin layer is adhered to a sheet of glass.

Referring first to FIG. 1, a decorative multipane window 10 includes a tempered glass base sheet 12 onto which a plastic resin layer 14 is directly molded and adhered. Resin layer 14 comprises individual window pane replicas 16 which are separated by simulated came 18. Simulated came 18 may be formed in traditional colors for such windows such as a brass color, lead color or black color. While plastic resin layer 14 is preferably transparent, it may also be composed primarily of a tinted material to provide a different decorative visual effect. The overall peripheral shape of window 10 as well as the individual shapes of the pane replicas 16 may be rectangular as shown or may be formed in any other desired shape or shapes as will be appreciated from the description of the molding process below.

After window 10 is mounted as a decorative element, its entire visible front surface will be that of plastic resin layer 14 having pane replicas 16. If it is viewed from the opposite side, its entire visible rear surface will be that of a glass sheet 12. Thus, any possible difference between the material of plastic resin layer 14 and that of glass sheet 12 will not be readily distinguishable from one or other side of window 10. Moreover, when plastic resin layer 14 is formed across glass sheet 12 in the preferred continuous manner as shown, a maximum benefit is obtained in combining the mechanical and thermal properties of the two layers 12, 14.

The thickness of the thickest portions of plastic resin layer 14 is preferably approximately equal to that of glass sheet 12. This relationship has been determined to produce a window 10 which looks most like a solid glass decorative window. Also, this relationship provides a desirable combination of the mechanical and thermal properties of glass layer 12 and plastic resin layer 14.

The Master

Figure 2:
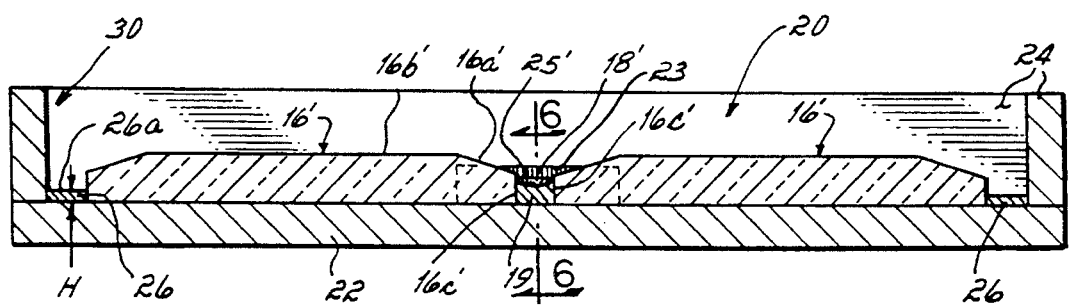
FIG. 2 is a cross-sectional elevation of a glass master prepared in accordance with the process of this invention for making simulated multipanel windows.

Referring first to FIG. 2, the first step for making a simulated multipane came type window 10 (FIG. 1) as a replica of a substantially all glass master is the making of glass master 20. Glass master 20 has features corresponding to the features desired in the finished decorative window 10 (FIG. 1). In this regard, glass master 20 includes individual master panel pieces 16' which are preferably beveled glass window panes corresponding to pane replicas 16 of decorative window 10 as shown in FIG. 1. Also, master 20 further includes gaps 18' preferably about ¼ inch wide between adjacent master panel pieces 16' and corresponding in location to simulated cane 18 of window 10. Each of the master panel pieces 16' include beveled portions 16a' and flat outer surface portions 16b' respectively corresponding to beveled portions 16a and flat outer surface portions 16b of pane replicas 16 shown in FIG. 1. Each panel piece 16' further includes vertical side edges 16c' spaced from each other by predetermined gaps 18'.

All of the glass master panel pieces 16' are adhesively mounted on a backing board or sheet 22 which is preferably formed of a high strength laminated glass. Silicone adhesive is preferably applied about the periphery of the underside of each master panel piece 16'. A paper design outline (not shown) indicating the orientation and spacing of the master panel pieces 16', is disposed beneath glass backing sheet 22 so that the master panel pieces 16' may be precisely aligned on top of backing sheet 22 in a desired array. After all master panel pieces are adhered and cured in approximately two to three hours, a high shine epoxy resin filler 19, such as MC 1213 AB which may be obtained from Mavidon Corp. of Palm City, Fla., is applied between vertical edges 16c' within gaps 18'.

Figure 6:
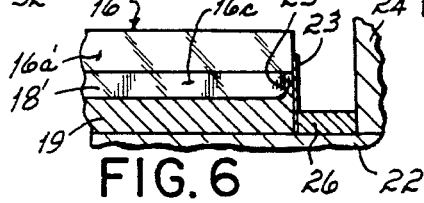
FIG. 6 is a fragmented cross sectional view of the master taken along line 6—6 of FIG. 2.

As shown in FIG. 2 and better illustrated in FIG. 6, a piece of masking tape 23 is applied across each end of gaps 18' and between two adjacent master panel pieces 16'. This prevents the leakage of filler 19 from the ends of gaps 18' both during and after application thereof. Due to shrinkage of the exposed epoxy resin surface during curing, the end 25' of filler bead 19 which abuts against tape 23 will be slightly raised. In the final window replica 10 which is formed, this advantageously creates a slight end dam or stop which helps with the neat application of simulated came 18 (FIG. 1) as will be discussed further below.

A peripheral upstanding framework 24 is mounted atop backing sheet 22 and peripheral spacers or height compensating strips 26 may be necessary in certain applications.

The height of spacers 26 determine the overall thickness of plastic resin layer 14 of windows 10 which will be ultimately reproduced as shown in FIG. 1. Finally, smooth glass portions of master 20 are polished to a high gloss and master 20 is waxed using a wax product such as Johnson's Paste Wax, which can be obtained from S. C. Johnson & Son, Inc. of Racine, Wis.

Referring again to FIG. 2, to obtain an optimum thickness of resin portion 14 (FIG. 1), the depth of mold 28 (FIG. 3) is controlled by controlling the height of spacers 26 in accordance with the thickness of panel pieces 16'. When panel pieces 16' are one eighth inch thick, no spacers 26 are necessary. When panel pieces 16' are greater than one eighth inch thick, spacers 26 having a height "H" are used such that the distance between upper surfaces 26a of spacers 26 and upper surfaces 16b' of panel pieces 16' equals approximately one eighth inch. As further shown in FIG. 2, the height of filler material 19 contained in gaps 18' is always higher than the height of spacers 26 and, most preferably, extends approximately two thirds of the way up vertical side edges 16c'. As also shown, upper surface of the cured epoxy resin filler 19 advantageously forms a concave surface which will readily receive simulated came resin beads when a replica 10 is made using a mold 28 formed from master 20. Filler material 19 is always applied to a height which is greater than the height of any spacers 26 which are used such that the finished replica has a continuous resin portion 14, i.e., such that the glass sheet is not exposed at the gaps between panel replicas 16 (FIG. 1).

Forming the Mold

Figure 3:
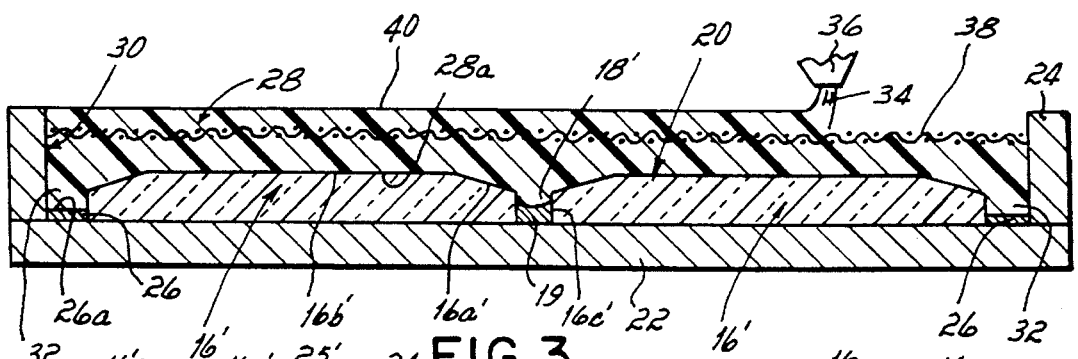
FIG. 3 is a cross-sectional elevation of a mold being prepared for making replicas of the glass master shown in FIG. 2.

Referring to FIG. 3, the second step for producing simulated multipane window 10 as a replica of glass master 20 is the fabrication of a mold 28 for duplicating the surface features of glass master 20 including bevel regions 16a', flat surface regions 16b' and gaps 18' for receiving simulated came structure. Fabricating mold 28 is accomplished by filling a mold producing cavity 30 atop glass master 20 and inside peripheral framework 24 with a catalyzed silicone. Peripheral walls 32 are thereby formed around the edges of mold 20 and extend downward to the upper surfaces 26a of spacers 26. The thickness of spacers 26 therefore determines the overall depth of cavity 30 in mold 28 which is formed by glass master 20.

A cavity 30 is then filled with a curable liquid silicone mixture 34, hereinafter described, from a source 36 to an intermediate level at which a section of screen wire 38 is laid to reinforce the mold 28. The remainder of cavity 30 above screen 38 is then filled with additional silicone mixture 34 to produce a flat upper surface 40. Thereafter, mixture 34 is allowed to cure at room temperature for approximately 24 hours to form mold 28. After curing, mold 28 is removed from glass master 20 and from peripheral framework 24 and spacers 26.

Curable silicone mixture 34 includes 10 parts HS II, RTV Silicone, available from Dow Corning Corporation of Midland, Mich., mixed with one part 10:1 Colored HS II Catalyst also available from Dow Corning. In addition, a light oil additive, such as Hoppe's 1003, supplied by Penguin Industries of Coatsville, Pa., is mixed with a fast curing tin catalyst, such as HS II, RTV Catalyst, available from Dow Corning as mentioned above. About 30 cubic centimeters of oil additive and 10 cubic centimeters of fast curing catalyst is added per pound of silicone mixture. These components are mixed first with each other, and then the mixture of RTV silicone and Colored HS II Catalyst. Before the resulting mixture 34 is poured to produce mold 28, the mixture 34 is placed under vacuum for three to five minutes to remove entrapped air.

The use of the light oil additive makes it unnecessary to apply a conventional mold release agent to the surface of the glass master 20 before the catalyzed silicone 34 is poured. If less than 20 cubic centimeters of oil is added per pound of silicone mixture 34, this effect is lost and a conventional mold releasing agent is needed to prevent the tearing of the mold due to adhesion between mold 28 and glass master 20. If more than 40 cubic centimeters of oil is added per pound of silicone mixture 34, the oil will migrate to the surface of the mold 28 leaving an unacceptable image on the surfaces 16a, 16b of window 10 formed within mold 28. This migration in a mold having too high an oil content occurs over time and the useful life of such a mold 28 is thereby reduced from a capability, for example, of producing over 30 satisfactory windows to 6 or less. Thus, adding light oil as an additive in the proper proportion eliminates the need for and associated problems with conventional mold release agents, such as impressions left on the surface of the mold, which in turn leave unacceptable blemishes on the smooth surfaces, such as surfaces 16a and 16b of window 10 (FIG. 1).

The wax previously applied to the glass master 20 is also a preferred part of this process. If this waxing is not done, a coating of silicone will be left on the surface of the glass master 20 when mold 28 is removed therefrom. In this case, mold 28 will be suitable for making windows 10 (FIG. 1), but glass master 20 will not be suitable for making additional molds 28 when they are required. Using wax in this way does not cause unsatisfactory images to be left on windows 10 subsequently made using mold 28.

The use of a fast curing tin catalyst hastens the curing process allowing more rapid mold fabrication. If too much tin catalyst is used, the curing process does not allow an adequate working life for the mixture to be properly applied within the mold cavity 30. Using 10 cubic centimeters of this catalyst per pound of silicone mixture 34 produces a working life of about one half hour which has proven to be adequate for this purpose.

Forming the Window Replica From the Mold

Referring now to FIG. 4, the third step for making replicated decorative multipane window 10 as a replica of glass master 20 is using mold 28 to form a replica. Mold 28, after being removed from glass master 20, is inverted from the position in which it is fabricated, and flat surface 40 thereof is placed against a supporting sheet of glass 44 in a fixture 46 such that mold cavity 28a, which corresponds in shape to the glass master 20, is directed upwardly. Fixture 46 is capable of supporting a sheet of glass 44 in either a slanted position or a level position. Fixture 46 may include, for example, several rows of pegs 50, 52, 54 upstanding from a table 48. Sheet of glass 44 may be placed on a forward row of pegs 50 and either on a lower rear row of pegs 52 or on a higher rear row of pegs 54. Sheet of glass 44 is initially placed in a slanted position, as shown in FIG. 4, such that it rests on rows of pegs 50 and 52 resulting in one end 56 of mold 28 extending in an upward direction.

After fixture 46 and sheet of glass 44 have been assembled as described above, tempered glass sheet 12 which is to be part of window 10 is prepared. In a preferred embodiment of this preparation process, this includes coating the side of glass sheet 12 which is to be adhered to the plastic resin layer 14 with an adherent chemical which adheres to both the glass and the resin. Preferably, the adherent chemical permits the resin and glass to adhere to one another by the cross linkage of polymer chains with the structure of the adherent.

In the preferred process, a glass sheet 12 is washed and one surface is coated with a mixture of alcohol, water and organosilane ester, which may be obtained as type A174 from Union Carbide of Atlanta, Ga. The preferred mixture for this purpose is composed of equal volumes of deionized water and denatured alcohol to which 0.5% by volume, of organosilane ester is added. The water and alcohol evaporate, leaving a dried coating of organosilane ester on the surface of glass sheet 12. This coating has been found to function as an adherent when applied in this manner. This method is superior in terms of the adhesive properties of the lamination subsequently formed, to the use of organosilane ester simply as a component in the catalyzed resin mixture.

After the adherence coating process is complete, glass sheet 12 is placed atop mold 28, as shown in FIG. 4, and against upstanding peripheral walls 32, with the coated side of glass sheet 12 facing downwardly into mold cavity 28a. Next, spring clamps 58 (only one of which is shown) are placed in spaced apart relationships around the three sides of mold 28 remote from raised end 56. Each spring clamp 58 includes a clamping bracket 60 pivotally mounted on a lower bracket 62 by a rod or pivot pin 64. Each clamping bracket 60 includes a clamping tab 66 extending atop glass sheet 12 and an outwardly extending clamping handle 68. Similarly, each lower bracket 62 includes a lower tab 70 extending under glass sheet 44 and an outwardly extending lower handle 72. A compression spring 74, extending between clamping bracket 60 and lower handle 72 outside pivot pin 64, applies clamping forces between tabs 66, 70 so that the lower surface of glass sheet 12 is locally clamped against peripheral walls 32 of mold 28. Spring clamps 58 may be manually loosened for installation or removal by applying manual pressure between the outer surfaces of clamping handle 68 and lower handle 72.

A hollow needle-like tube 76 extending from a supply tube or chamber 78 is next inserted into upper end 56 of mold 28 to fill mold cavity 28a with a catalyzed transparent liquid resin 80. A mixture of 97.3% clear polyester resin, supplied as product 249A by BP Chemicals of Fort Wright, Ky., 1.0% organosilane ester, supplied as type A174 by Union Carbide at Atlanta, Ga., 0.85% methylethylketone peroxide supplied as Cadox-M-50 by Akzo Chemical of Chicago, Ill., and 0.85% heat curing catalyst, supplied as USP-240 by Witco Chemical of Richmond, Calif., has been found to work well as the catalyzed resin for this application. Alternatively, a tinted plastic resin could be used to obtain a different desirable visual effect in the resulting window 10.

The resin curing process is begun by the methylethylketone peroxide and completed, as the exothermic reaction raises the temperature of the mixture to about 200° F., by the heat curing catalyst. The organosilane ester within the mixture, together with the layer of this material which has dried on the surface of glass sheet 12 promotes the adhesion of polymers from the resin 80 to the surface of glass sheet 12, particularly by the cross linking of polymer chains within the resin with organosilane ester adhered to the glass surface. These products may be properly mixed and dispensed through tube 76 by means of a resin transfer molding machine, such as a multiflow CVR type, supplied by Liquid Control Corporation of North Canton, Ohio.

After a measured amount of liquid resin 80 is introduced into mold cavity 28a, as shown in FIG. 4, glass sheets 12 and 44, as well as spring clamps 56, are brought into a level position within fixture 46 with glass sheet 44 resting on pegs 50 and 54. This allows resin 80 to flood the mold 28 completely and evenly. One or more additional spring clamps 58 are placed along mold end 56 so that mold 28 is completely sealed with peripheral walls 32 held against the lower side of glass sheet 12. Any air bubbles, which may have become trapped within liquid resin 80 during these mixing and pouring processes, are easily seen by inspection through glass sheet 12 and may be removed by applying a needle attached to an evacuation device (not shown) extending through the silicone mold 28. Mold 28 is self sealing after such small punctures are made to eliminate bubbles.

The level mold assembly is then left to cure within fixture 46 at room temperature for approximately 1 to 2 hours. After curing is complete, spring clamps 58 are removed and a replica window 10, consisting of glass sheet 12 and a molded, cured resin layer 14 shaped within mold cavity 28a, is removed from mold 28. Additional replicas of the glass master 20 may be produced using mold 28 in the same way again and additional molds 28 may be produced, if required, using glass master 20 in the same manner described above.

Figure 7:
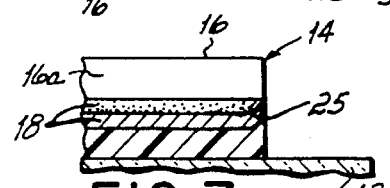
FIG. 7 is a fragmented cross sectional view of the decorative window replica taken along line 7 of FIG. 1; and, FIG. 8 is a cross-sectional elevation of a second embodiment of the invention in which a second sheet of glass is supported and affixed in spaced apart relationship to the backing sheet of glass of the replica to form a dual pane window structure having the decorative multipaneled replica portion sealed therein.

The final step in making window 10 shown in FIG. 1 involves the application of beads of came resin between adjacent panel replicas 16 to produce the simulated came structure. One resin which may be used is Glasslam RE117 which may be formed, for example, in a black or brass color and obtained from N.G.I., Inc. located in Pompano Beach, Fla. An alternative resin which may be used is Roskydal No. 500 A which may be obtained from Miles Industry Chemicals located in Pittsburgh, Pa. The came resin may be applied by using a plastic one pint bottle with a nozzle having a pipet end. The squeeze bottle may be used to apply the came resin in a bead-like form into the groove formed between adjacent panel replicas 16 as shown best in FIGS. 5 and 7. Came resin 18 should be applied only up to the level where bevels 16a begin in order to produce a neat and realistic "came" look for window 10. As further shown in FIG. 7, the grooves between adjacent panel replicas 16 include raised end portions 25 which correspond to the raised end portions 25' of filler 19 used in master 20 and shown in FIG. 6. Raised end portion 25 creates a slight dam or stop to help keep came resin 18 from flowing out of clear plastic resin layer 14 and creates a neat appearance for the simulated came 18 of window 10. After the came resin has been completely applied to window 10, window 10 is laid flat for one hour for purposes of allowing the came resin to cure.

The Insultated Decorative Window Embodiment

As shown in FIG. 8, in an alternative embodiment, simulated multipane replica window 10 may be included within a window assembly 82 having a second glass sheet 84 fastened to glass sheet 12 in a spaced apart relationship to enclose plastic resin layer 14 therebetween. Window assembly 82 includes a hollow metal tube 86 along each edge. Tube 86 may be obtained as a Trimline Spacer from the Hygrade Company of New York, N.Y. To form the framework, adjacent tubes 86 are joined at the corners with plastic L-shaped brackets (not shown) extending into their hollow centers. Tubes 86, which include inwardly directed rows of small holes 88, are partly filled with a desiccating material to prevent the formation of condensed moisture on surfaces within window assembly 82. The regions between the outer surfaces of tubes 86 and the edges of glass sheets 12, 84 are filled with a sealing material 90, such as Polypo, provided by the Product Research Corporation of Atlanta, Ga., for form a hermetic seal.

One advantage of the configuration of window assembly 82 is that both exterior sides are flat glass. This simplifies cleaning, since dirt cannot become trapped in any grooves of plastic resin layer 14, and presents the most scratch resistant to the outside of both sides. Moreover, the intermediate dead air space, or trapped air, is not circulated between glass sheets 12 and 84, and therefore greatly reduces the transfer of heat in both directions through the window assembly 82. For these reasons, the configuration of window assembly 82 is particularly suitable for exterior window openings in buildings.

A number of advantages relative to the prior art are achieved by the invention described above. While simulated glass multipane replicas 10 are manufactured for a small fraction of the cost of real multipane decorative glass products produced by traditional methods, the appearance of replica windows 10 of the instant invention, is strikingly similar to the real glass counterpart products of the prior art. The resin materials described have excellent optical clarity, with a greenish shading in thick sections very similar to that of glass. The process of this invention results in very good adhesion between glass sheet 12 and plastic resin layer 14, preventing delamination or separation of layers 12 and 14 due to stresses resulting from thermal expansion even when a thick resin layer is applied and when the window is in a location having severe temperature swings, such as in an exterior architectural application.

The mechanical and thermal properties of replica window 10 are in many ways superior to both a traditional multipane glass window or a window composed entirely of thermoplastic material, such as polycarbonate. Since the plastic resin layer 14 and glass sheet 12 of replica window 10 are tightly adhered together, the toughness of the resin layer 14 reduces the danger that the glass sheet 12 will break under impact, while the stiffness of the glass sheet 12 increases the flexural rigidity of the replica window 10. Further, the relatively low thermal conductivity of the plastic resin layer 14 reduces the flow of heat through replica window 10. The thermal insulation properties can be further improved by the implementation of the alternative embodiment of FIG. 8, with the addition of a second sheet of glass which creates an insulative air space.

With the process of this invention, glass sheet 12 is a single, continuous piece of glass, and resin layer 14 is also continuous although it is designed to provide the appearance of a composite made from a number of individual pieces of glass such as in a traditional leaded glass window. A simulated multipane glass replica window 10 constructed in accordance with this invention may therefore be used in applications where building codes require the use of single pane windows. Further safety advantages are achieved by using tempered glass for glass sheet 12.

Although detailed embodiments of this invention have been described above, it will be readily appreciated by those of ordinary skill in the art that many substitutions and modifications may be made without departing the spirit and scope of the invention and Applicant therefore does not intend to be bound by the details provided but only by the scope of the appended claims.

What is claimed is:

1. A method of making a master of a decorative simulated multipane window, the method comprising the steps of:

adhering a plurality of generally flat master panel pieces to a backing sheet in a predetermined array and with gaps formed between adjacent master panel pieces;

filling in said gaps with a curable material to a height below upper surfaces of said master panel pieces; and, forming a peripheral upstanding framework about said master panel pieces and extending upwardly above said upper surfaces of said master panel pieces.

2. The method of claim 1 further comprising the step of forming said framework peripherally spaced from said array of master panel pieces.

3. The method of claim 2 further comprising the step of placing height compensating spacers peripherally about said array of master panel pieces and within said peripheral framework.

4. The method of claim 1 wherein said master panel pieces are pieces of glass.

5. The method of claim 4 wherein said pieces of glass have peripheral beveled portions and vertical side edge portions adjacent said gaps and said curable material is filled up to approximately two thirds the height of said vertical side edge portions.

6. The method of claim 5 wherein said gaps are approximately ¼ inch wide.

7. A method of making a mold of a master for subsequent use in fabricating decorative windows having simulated came structure, the method comprising the steps of:

forming a master by adhering a plurality of master panel pieces to a backing sheet in a predetermined array;

providing a surrounding framework of upstanding walls spaced apart from said master to define a mold producing cavity;

preparing a curable liquid mold mixture;

pouring said mixture into said mold producing cavity and on top of said master with said mixture being contained within said surrounding framework;

allowing said mold mixture to cure within said mold producing cavity; and, removing said mold from said mold producing cavity.

8. The method of claim 7 wherein said curable liquid mold mixture is a catalyzed silicone mixture prepared by mixing silicone, a catalyst and a light oil.

9. The method of claim 8 wherein said light oil is in an amount of between 20 and 40 cubic centimeters per pound of silicone mixture.

10. The method of claim 9 wherein the step of preparing said catalyzed silicone mixture comprises the steps of:

mixing silicone and a slow-acting catalyst to form a first mixture;

mixing a slow-acting catalyst and a light oil to form a second mixture; and, mixing said first mixture with said second mixture.

11. A method of making a decorative window having a simulated multipane appearance, the method comprising the steps of:

forming a master from a plurality of generally flat, spaced apart panel pieces which are adhered to a backing sheet and located within and spaced inwardly from, a peripheral upstanding frame;

forming a mold having a mold cavity defined by the master by filling the space within the frame not occupied by the panel pieces with a curable mold material;

curing the mold material and removing the panel pieces from the mold to expose the mold cavity surrounded by a peripheral region having an exposed flat surface;

clamping the mold to a glass sheet with the flat surface thereof in contact with the glass sheet and with the mold cavity adjacent to the glass sheet;

filling said mold cavity with a catalyzed translucent plastic resin;

curing said resin within the mold cavity to form a resin layer adhered to said glass sheet, the resin layer forming simulated panes corresponding to the panel pieces of the master and grooves corresponding to the spaces between panel pieces of the master;

removing the mold from contact with the resin layer and glass sheet; and, filling the grooves formed in the resin layer with a curable material to simulate came structure between adjacent simulated panels.

12. The method of claim 11 further comprising the steps of:

coating a first surface of said glass sheet which is to be adhered to said resin layer with an adherent; and, adding said adherent to said resin before filling said internal cavity with said resin.

13. The method of claim 12 wherein said adherent is organosilane ester.

14. The method of claim 13 wherein said coating step further includes coating said first surface with a mixture of water and alcohol which includes about 0.5% organosilane ester by volume.

15. The method of claim 11 wherein said catalyzed resin consists essentially of a transparent plastic resin, a catalytic agent for curing said resin and organosilane ester.

* * * * *